United States Patent
Templin et al.

[15] 3,645,098
[45] Feb. 29, 1972

[54] EXHAUST EMISSION CONTROL

[72] Inventors: Robert J. Templin, Bloomfield; Paul R. Johnson, Metamora; Robert F. Falberg, Birmingham, all of Mich.

[73] Assignee: General Motors Corporation, Detroit, Mich.

[22] Filed: Sept. 28, 1970

[21] Appl. No.: 75,834

[52] U.S. Cl. ............................ 60/30 R, 123/119 A, 23/2 E, 23/288 F
[51] Int. Cl. ............................................. F01n 3/14
[58] Field of Search ............... 60/29 A, 30 R; 123/119 A; 23/288 F, 2 E

[56] References Cited

UNITED STATES PATENTS

| | | | |
|---|---|---|---|
| 1,756,897 | 4/1930 | Bilsky | 60/29 A |
| 2,942,932 | 6/1960 | Elliott | 60/30 R |
| 3,172,251 | 3/1965 | Johnson | 60/30 R |
| 3,306,033 | 2/1967 | Cornelius | 60/30 R |
| 3,393,668 | 7/1968 | Milgram | 60/30 R |
| 3,476,524 | 11/1969 | Burke | 123/119 A |

*Primary Examiner*—Douglas Hart
*Attorney*—J. L. Carpenter and C. K. Veenstra

[57] ABSTRACT

Internal combustion engine exhaust gases, passing unreacted through an exhaust gas catalytic or thermal reaction device during the warmup period of the device, are directed to an expansible container which retains the entire flow of exhaust gases or to a container of filter, adsorptive and absorptive material which retains undesirable constituents of the exhaust gases. After warmup of the reaction device, the retained gases or constituents are recirculated to the engine induction system or the reaction device. This approach supplements the emission control of the reaction device by preventing emission of undesirable exhaust gas constituents during starting of the engine and warmup of the reaction device.

14 Claims, 9 Drawing Figures

INVENTORS
Robert J. Templin,
Paul R. Johnson &
Robert F. Falberg
BY C.K. Veenstra
ATTORNEY Patented Feb. 29, 1972 3,645,098

INVENTORS
Robert J. Templin,
Paul R. Johnson &
Robert F. Falberg
BY C. K. Veenstra
ATTORNEY

EXHAUST EMISSION CONTROL

BACKGROUND OF THE INVENTION

Extensive development over the past several years indicates that exhaust gas reaction devices, such as catalytic converters and thermal reactor exhaust manifolds, have potential for reacting substantially all the undesirable constituents in internal-combustion engine exhaust gases. However, such devices are relatively inefficient at ambient temperatures, and the thermal mass of the reaction devices cannot be warmed to an efficient reaction temperature instantaneously. A period of about 1 to 3 minutes is usually required for the exhaust gases to heat a reaction device to its efficient reaction temperature. Thus exhaust gases formed during starting of the engine and during this warmup period are incompletely reacted. It is believed that a very high proportion of the undesirable exhaust gas constituents emitted from an engine equipped with an exhaust gas reaction device are emitted during this warmup period.

SUMMARY OF THE INVENTION

This invention relates to internal-combustion engines equipped with exhaust gas reaction devices and is designed to prevent emission of undesirable exhaust gas constituents from engines equipped with such reaction devices during starting of the engine and during warmup of the reaction devices.

In particular, this invention collects exhaust gases or undesirable constituents thereof passing unreacted through a reaction device when the temperature of the reaction device is below its efficient reaction temperature and recirculates the collected exhaust gases or exhaust gas constituents to the reaction device after its temperature reaches its efficient reaction level.

Several embodiments of this invention are set forth herein. It is suggested that selected exhaust gas constituents formed while starting and during the warmup period be separated and stored in a container of adsorptive, absorptive, or filtering material. As an alternative, it is suggested that the entire volume of exhaust gases formed while starting and during the warmup period be stored in an expansible container.

When the reaction device is warmed to an efficient reaction temperature, the stored exhaust gases or exhaust gas constituents are recycled to the reaction device and reacted therein. Thus undesirable exhaust gas constituents are not emitted to the atmosphere while starting and during the warmup period.

The stored exhaust gases or exhaust gas constituents may be recycled directly to the reaction device. It is suggested that this be accomplished by using a pump to draw the exhaust gases or exhaust gas constituents from the storage container and deliver them to the reaction device; the pump also may deliver air to the reaction device to support reaction of the exhaust gas constituents. As an alternative, it is suggested that the stored exhaust gases or exhaust gas constituents be recycled to the reaction device indirectly through the engine induction system and combustion chambers, using the induction system vacuum to draw the exhaust gases or exhaust gas constituents from the storage container.

THE PRIOR ART

The prior art includes a number of proposals to compensate for the inefficiency of reaction devices during their warmup period. It has been suggested, for example, that the reaction device be heated by electrical or direct flame means to reduce the warmup time. Such heating is not instantaneous, however, and the reaction device cannot cause efficient reaction of exhaust gases formed as the engine is started and during initial running.

It also has been suggested that charcoal or other means be disposed in the exhaust passage to separate and retain undesirable constituents. However, these retention arrangements have not been limited to operation during the warmup period of an exhaust gas reaction device and have not included any mechanism for purging and reacting constituents collected by the retention means. Thus such retention means would be quickly saturated and rendered ineffective by the continuous flow of exhaust gases therethrough.

In other proposals, exhaust gases would be retained in the reaction device until the reaction device became sufficiently warmed and the exhaust gas constituents reacted. With such an approach, however, the reaction device would require a large volume to store the exhaust gases formed during the warmup period; the increased mass of this large volume would require an even longer time to warm to an efficient reaction temperature.

In addition, the prior art includes proposals to recirculate a portion of the exhaust gases through the engine combustion chamber. These proposals do not encompass the present invention because none suggests that the exhaust gases or constituents thereof be stored during warmup and subsequently recycled.

It will be appreciated, therefore, that this invention provides a novel and simple means for preventing emission to the atmosphere of undesirable exhaust gas constituents and particularly those formed when starting and during initial operation of an engine.

The details as well as other objects and advantages of this invention are shown in the drawings and are set forth in the description of the various embodiments.

DESCRIPTION OF THE EMBODIMENTS

Figure 1:
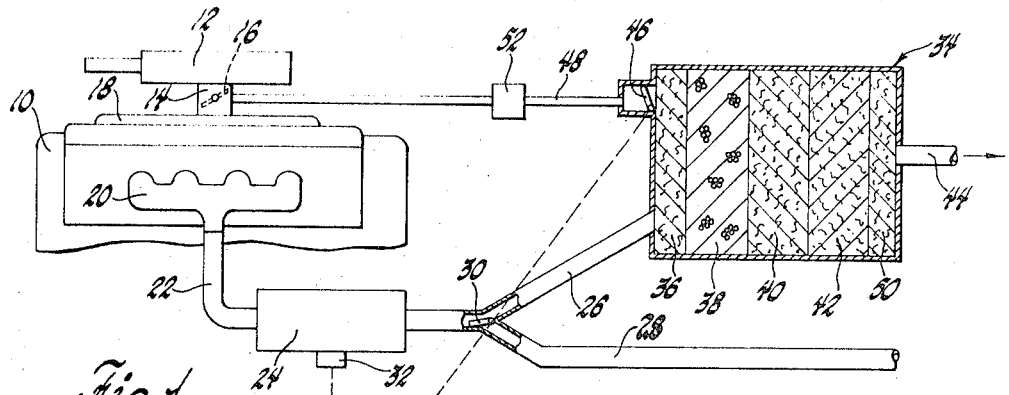
FIG. 1 is a schematic view of one embodiment of this invention showing an internal-combustion engine having an exhaust gas reaction device in conjunction with an exhaust gas constituent collection and recirculation system in which the exhaust gases passing unreacted through the reaction device are directed through a container having filter, adsorption and absorption media which separate undesirable exhaust gas constituents from the exhaust gas flow. The container is connected to the engine induction system so that the separated exhaust gas constituents are recycled through the combustion chambers as well as the exhaust gas reaction device.
Figure 2:
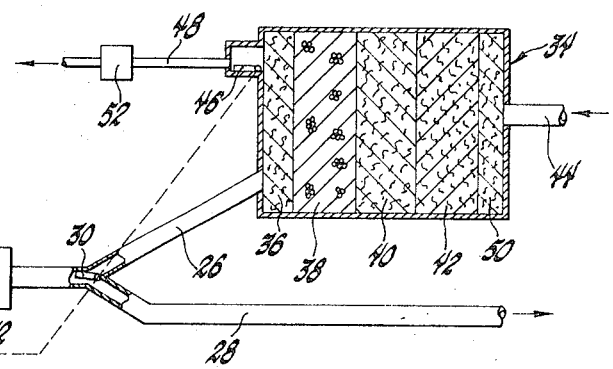
FIG. 2 is a view of a portion of the embodiment of FIG. 1 showing the control system when the reaction device is warmed to an efficient reaction temperature.

Referring first to FIGS. 1 and 2, an internal-combustion engine 10 has an air cleaner 12, a carburetor 14 including a throttle 16, and an intake manifold 18 which define an air induction passage leading to the engine combustion chambers.

Engine 10 also has an exhaust passage defined by an exhaust manifold 20 which receives gases exhausted from the combustion chambers, an exhaust pipe 22, a catalytic converter 24, a diversion passage 26, and an outlet passage 28. As shown here, outlet passage 28 leads directly to the atmosphere; however, in some instances it may be desired to incorporate other exhaust gas reaction devices or silencing devices therein.

Converter 24 can efficiently promote reaction of undesirable exhaust gas constituents under most conditions of operation, and emission of such constituents to the atmosphere is thereby prevented. However, converter 24 must be heated to a minimum temperature to cause the necessary reaction. Converter 24 is easily heated by the exhaust gases, but a period of about 1 to 3 minutes is usually required before the converter reaches the minimum temperature. Thus exhaust gases formed when starting the engine and during initial operation are not efficiently reacted.

This invention therefore provides a valve 30, operated by a sensor 32 which is responsive to the temperature of converter 24, to block the flow of exhaust gases through outlet passage 28 and to divert the flow of exhaust gases through diversion passage 26 to a container 34.

Container 34 includes a plurality of filter, adsorptive, and absorptive media for separating and storing undesirable exhaust gas constituents. These may include, for example, a filter medium 36 for separating and retaining particulates, an adsorptive medium 38 such as activated charcoal for separating and retaining hydrocarbons, an absorptive material 40 separating and retaining carbon monoxide, and an absorptive material 42 for separating and retaining oxides of nitrogen. After separation of the undesirable exhaust gas constituents, the remaining exhaust gases flow out of container 34 through a fitting 44.

When converter 24 has been warmed to an efficient reaction temperature, sensor 32 moves valve 30 to open outlet passage 28 and close diversion passage 26. At the same time, a purge valve 46 is opened by sensor 32. Induction passage vacuum, transmitted through a purge line 48, then induces an airflow through container 34 from fitting 44. A filter pad 50 is provided to filter the air. In passing through the various filter, adsorption and absorption media 36, 38, 40 and 42, the air purges exhaust gas constituents retained therein and delivers these unreacted constituents through the engine induction passage and combustion chambers to converter 24. In passing through the combustion chambers and converter 24, the undesirable constituents are reacted.

In this manner, this invention provides complete control of exhaust gases formed in engine 10. During most conditions of operation, converter 24 reacts the undesirable exhaust gas constituents and prevents emission thereof to the atmosphere. During the period required for warmup of converter 24, the undesirable constituents are stored in container 34 for subsequent recycling through converter 24.

A metering orifice or purge control valve 52 may be included in purge line 48 if desired.

Figure 3:
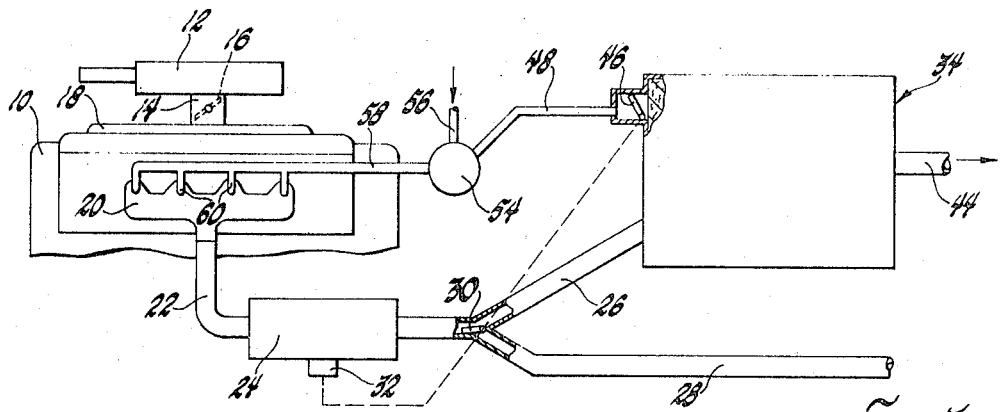
FIG. 3 is a schematic view of an alternative embodiment of this invention in which the container is connected to a pump which recycles the exhaust gas constituents directly to the reaction device through the exhaust manifold.
Figure 4:
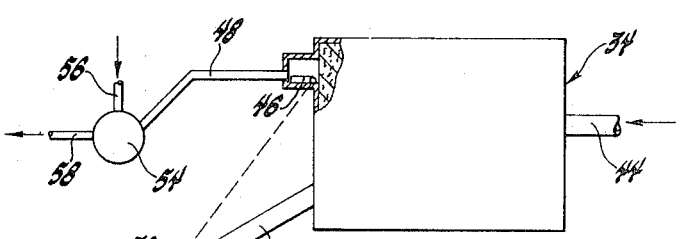
FIG. 4 is a view of a portion of the embodiment of FIG. 3 showing the control system when the reaction device is warmed to an efficient reaction temperature.

Referring next to the embodiment of FIGS. 3 and 4, the exhaust gas constituents may be recycled directly to the exhaust system instead of indirectly through the induction system and the combustion chambers. Purge line 48 extends to the inlet of a pump 54 which also has a fresh air inlet 56. The outlet 58 of pump 54 extends to a plurality of injection tubes 60 which discharge into exhaust manifold 20 adjacent the combustion chamber exhaust ports. During the warmup period of converter 24, purge valve 46 is closed and pump 54 delivers only fresh air to exhaust manifold 20. When converter 24 is warmed to an efficient reaction temperature, sensor 32 opens purge valve 46; pump 54 then draws air through container 34 to purge unreacted exhaust gas constituents from container 34. The unreacted exhaust gas constituents are mixed with the stream of air delivered by pump 54 to the exhaust system and reacted in converter 24.

It will be appreciated that the metering orifice or purge control valve 52 shown in the embodiment of FIGS. 1 and 2 may also be included in the embodiment of FIGS. 3 and 4. It also will be appreciated that other means may be utilized to purge the exhaust gas constituents from container 34 and recycle these constituents to converter 24.

It may be desirable to heat the adsorption and absorption media in container 34 to facilitate purging of the exhaust gas constituents retained therein. Referring to the embodiment of FIG. 5, this may be accomplished by passing the purge air through a heat exchanger 62 disposed about exhaust passage 28. In passing through heat exchanger 62, the air will be heated by the exhaust gases flowing from converter 24; the heated air will in turn heat the various media within container 34. In the FIG. 5 embodiment, it will be appreciated that purge passage 48 may include the metering orifice or purge control valve 52 shown in FIG. 1 and may extend either to the induction passage as shown in FIG. 1 or to pump 54 as shown in FIG. 3. It also will be appreciated that other means are available to heat container 34 in place of heat exchanger 62.

Figure 6:
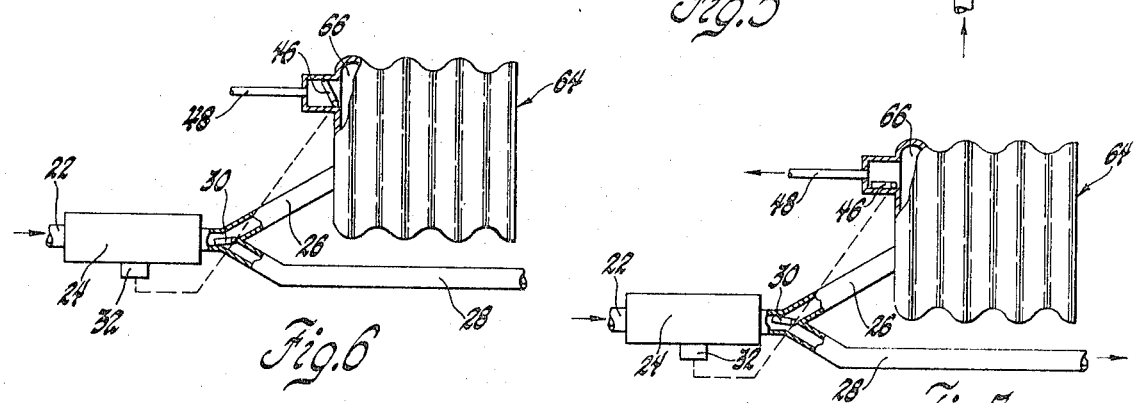
FIG. 6 is a schematic view of still another embodiment of this invention in which the container expands to store the entire flow of exhaust gases during the warmup period.
Figure 7:
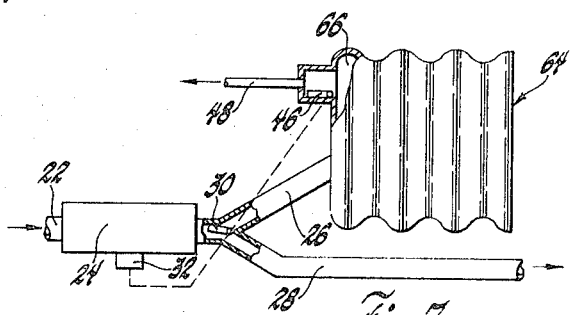
FIG. 7 is a view of the embodiment of FIG. 6 showing the control system when the reaction device is warmed to an efficient reaction temperature.

Referring next to the embodiment of FIGS. 6 and 7, diversion passage 26 directs unreacted exhaust gases from converter 24 to a container 64 providing an expansible chamber 66. During the warmup period, the entire flow of exhaust gases is collected in chamber 66. When reactor 24 is fully warmed, sensor 32 opens valve 46 and exhaust gases stored in chamber 66 are drawn through purge line 48 either to the induction passage as shown in FIGS. 1 and 2 or to pump 54 as shown in FIGS. 3 and 4. The unreacted exhaust gases are thereby recycled for reaction in converter 24. It will be appreciated that, here too, purge line 48 may include the metering orifice or purge control valve 52 shown in FIG. 1.

Figure 8:
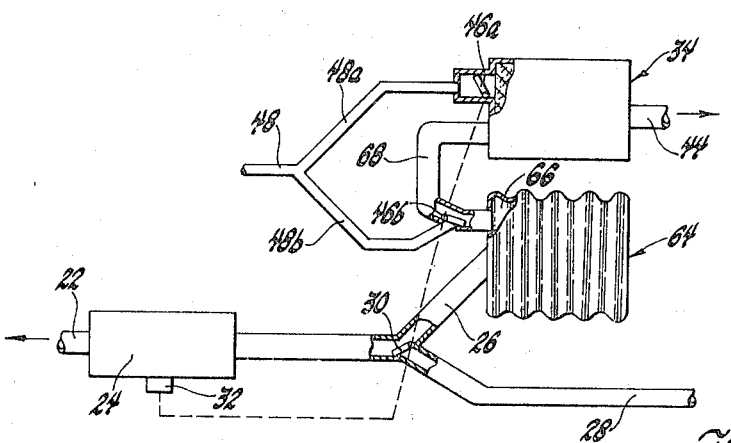
FIG. 8 is a schematic view of an embodiment of this invention which combines features of the embodiments of FIGS. 1 or 3 and 6.
Figure 9:
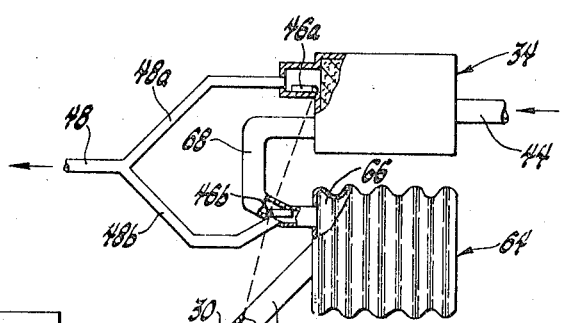
FIG. 9 is a view of the embodiment of FIG. 8 showing the control system when the reaction device is warmed to an efficient reaction temperature.

FIGS. 8 and 9 show one of several possible embodiments using containers 34 and 64 in combination. Referring to FIG. 8, valve 30 diverts the flow of exhaust gases through diversion passage 26 into expansible container 64 during the time in which converter 24 is being heated. An overflow passage 68 extends from container 64 to container 34. Passage 68 may contain suitable pressure control valves if desired. Thus if the capacity of chamber 66 is exceeded, the excess exhaust gases travel through passage 68 to container 34 where the undesirable exhaust gas constituents are separated and retained.

Figure 5:
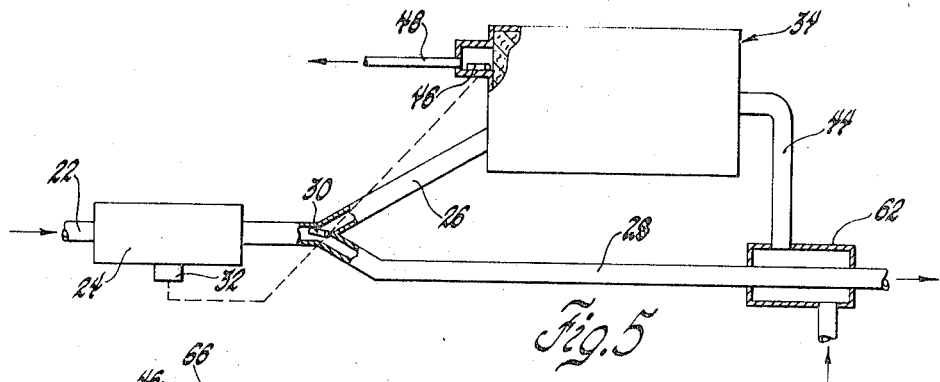
FIG. 5 is a schematic view of another embodiment of this invention, similar to that of FIGS. 2 and 4, in which means are provided for heating airflow through the container to facilitate purging of the exhaust gas constituents from the storage media.

As shown in FIG. 9, after converter 24 is warmed to an efficient reaction temperature, sensor 32 moves valve 30 to close diversion passage 26 and open outlet passage 28. At the same time, a valve 46a is opened; fresh air then is drawn into container 34 through fitting 44, and the unreacted exhaust gas constituents are purged through a line 48a and line 48. In addition, a valve 46b is moved to close overflow passage 68 and to open a purge line 48b; the exhaust gases stored in expansible chamber 66 are then purged through line 48b and 48. Here again, it will be appreciated that purge line 48 may extend either to the engine induction system as shown in FIG. 1 or to pump 54 as shown in FIG. 3 and may include the metering orifice or purge control valve 52 as shown in FIG. 1. Moreover, fitting 44 may extend to the heat exchanger 62 as shown in FIG. 5.

It will be appreciated that the warmup characteristics of other exhaust gas reaction devices, such as a thermal reactor incorporated in the exhaust manifold, display similar delays in reaching an efficient reaction temperature. It is contemplated that this invention would be equally advantageous when used with such devices.

The two embodiments 34 and 64 of the storage container have individual advantages. Container 34 with its various filter, adsorption, and absorption media selectively separates and retains certain of the exhaust gas constituents. Charcoal 38, for example, is known for its efficiency in separating and retaining hydrocarbons and is particularly effective in retaining the high molecular weight hydrocarbons which have been alleged to be carcinogenic. Expansible container 64, on the other hand, collects all exhaust gases formed during starting and warmup.

In testing this invention, container 34 was provided with about 5 gallons, 45 pounds, of activated charcoal. The amount required in actual use will vary with the time required for converter 24 to reach an efficient reaction temperature and with the volume of exhaust gases produced by engine 10 during that time. This invention also was tested by forming container 64 from a bag having a volume of 75 cubic feet and by discharging exhaust gases thereto at atmospheric pressure. The volume required for container 64 in actual use would vary with the time required for converter 24 to reach an efficient reaction temperature and with the volume of exhaust gases produced by engine 10 during this time. The volume required for container 64 may be reduced if exhaust gases are stored at pressures higher than atmospheric. In such circumstances, container 64 may require a pressure relief valve.

It is anticipated that the effectiveness of container 34 to separate and store exhaust gas constituents will not diminish substantially even after a large number of charging and stripping cycles. The separation and retention efficiency of container 34 may be measured by flowing test gases through one end and sampling outflow through the opposite end.

Although converter 24 is shown here as displaced somewhat from manifold 20, it will be appreciated that the efficiency of a catalytic converter is generally enhanced and the warmup time reduced when it is disposed close to manifold 20.

From the foregoing, it will be appreciated that this invention provides a two phase mechanism for controlling exhaust gas emissions. As the engine is started and during initial operation, undesirable exhaust gas constituents are collected in a storage container. After the warmup period, an exhaust gas reaction device is utilized to prevent emission of undesirable constituents and the unreacted constituents formed during starting and warmup are recycled through the reaction device.

We claim:

1. The method of purifying gases exhausted from a combustion chamber comprising the steps of:
    passing the gases through an exhaust gas reaction device effective to cause reaction of exhaust gas constituents when the temperature of said reaction device is above a minimum temperature,
    collecting and retaining in a storage container exhaust gas constituents passed unreacted through said reaction device when the temperature of said reaction device is below said minimum temperature,
    and recycling the retained exhaust gas constituents from said storage container through said reaction device when the temperature of said reaction device is above said minimum temperature,
    whereby exhaust gas constituents passed unreacted through said reaction device when the temperature of said reaction device is below said minimum temperature are recycled through and reacted in said reaction device when the temperature of said reaction device is above said minimum temperature.

2. The method of operation an internal-combustion engine having a combustion chamber, an exhaust passage for exhaust gas flow from said combustion chamber to the atmosphere, and an exhaust gas reaction device in said exhaust passage effective to cause reaction of exhaust gas constituents flowing therethrough when the temperature of said reaction device is above a minimum temperature to thereby prevent emission of such constituents to the atmosphere, said method comprising the steps of:
    blocking said exhaust passage downstream of said reaction device when the temperature of said reaction device is below said minimum temperature to thereby prevent emission of unreacted exhaust gas constituents to the atmosphere,
    directing exhaust gases flowing unreacted from said reaction device when the temperature of said reaction device is below said minimum temperature to a storage means effective to retain unreacted exhaust gas constituents,
    permitting exhaust gases to flow through said exhaust passage from said reaction device to the atmosphere when the temperature of said reaction device is above said minimum temperature, said reaction device then being effective to cause reaction of exhaust gas constituents to thereby prevent emission of such constituents to the atmosphere,
    and recycling the retained exhaust gas constituents from said storage means to said reaction device when the temperature of said reaction device is above said minimum temperature whereby said reaction device causes reaction of retained exhaust gas constituents and whereby said storage means is purged or unreacted exhaust gas constituents and is prepared for future retention of further unreacted exhaust gas constituents.

3. In an internal-combustion engine power plant having a combustion chamber, an exhaust passage for exhaust gas flow from said combustion chamber to the atmosphere, and an exhaust gas reaction device in said exhaust passage effective to cause reaction of exhaust gas constituents flowing therethrough when the temperature of said reaction device is above a minimum temperature to thereby prevent emission of such constituents to the atmosphere, the combination comprising:
    storage means for retaining unreacted exhaust gas constituents,
    means for preventing exhaust gases flowing unreacted through said reaction device when the temperature of said reaction device is below said minimum temperature from flowing to the atmosphere and for directing such exhaust gases into said storage means whereby unreacted exhaust gas constituents are retained in said storage means,
    and means for recycling the retained exhaust gas constituents from said storage means to said reaction device when the temperature of said device is above said minimum temperature,
    whereby exhaust gas constituents flowing unreacted through said reaction device when the temperature of said reaction device is below said minimum temperature are recycled through and reacted in said reaction device when the temperature of said reaction device is above said minimum temperature.

4. The combination set forth in claim 3 wherein said storage means comprises a container which expands as exhaust gases are directed thereto and which contracts as exhaust gases are recycled therefrom.

5. The combination set forth in claim 3 wherein said storage means comprises material which separates certain exhaust gas constituents from the flow of exhaust gases directed thereto.

6. The combination set forth in claim 5 wherein said material includes activated charcoal which adsorbs hydrocarbons from the flow of exhaust gases directed thereto.

7. In an internal-combustion engine power plant having a combustion chamber, an exhaust passage for exhaust gas flow from said combustion chamber to the atmosphere, an exhaust gas reaction device in said exhaust passage effective to cause reaction of exhaust gas constituents flowing therethrough when the temperature of said reaction device is above a minimum temperature to thereby prevent emission of such constituents to the atmosphere, and means for delivering air to said reaction device to support reaction of exhaust gas constituents therein, the combination comprising:
    storage means for retaining unreacted exhaust gas constituents,
    means for preventing exhaust gases flowing unreacted through said reaction device when the temperature of said reaction device is below said minimum temperature from flowing to the atmosphere and for directing such exhaust gases into said storage means whereby unreacted exhaust gas constituents are retained in said storage means,
    and means for directing the retained exhaust gas constituents from said storage means to said air delivering means when the temperature of said reaction device is above said minimum temperature to thereby recycle unreacted exhaust gas constituents to said reaction device, whereby exhaust gas constituents flowing unreacted through said reaction device when the temperature of said reaction device is below said minimum temperature are recycled through and reacted in said reaction device when the temperature of said reaction device is above said minimum temperature. emission 8. In an internal-combustion engine power plant having a combustion chamber, an induction passage for airflow to said combustion chamber, an exhaust passage for exhaust gas flow from said combustion chamber to the atmosphere, and an exhaust gas reaction device in said exhaust passage effective to cause reaction of exhaust gas constituents flowing therethrough when the temperature of said reaction device is above a minimum temperature to thereby prevent emission of such constituents to the atmosphere, the combination comprising:

storage means for retaining unreacted exhaust gas constituents, means for preventing exhaust gases flowing unreacted through said reaction device when the temperature of said reaction device is below said minimum temperature from flowing to the atmosphere and for directing such exhaust gases into said storage means whereby unreacted exhaust gas constituents are retained in said storage means, and means for directing the retained exhaust gas constituents from said storage means to said induction passage when the temperature of said reaction device is above said minimum temperature to thereby recycle unreacted exhaust gas constituents to said combustion chamber and said reaction device, whereby exhaust gas constituents flowing unreacted through said reaction device when the temperature of said reaction device is below said minimum temperature are recycled through and reacted in said reaction device when the temperature of said reaction device is above said minimum temperature.

9. In an internal-combustion engine having a combustion chamber which exhausts gases through an exhaust gas reaction device effective to cause reaction of exhaust gas constituents when the temperature of said reaction device is above a minimum temperature, the combination comprising:

means for separating and storing certain unreacted exhaust gas constituents from a flow of exhaust gases, means for directing the exhaust gases flowing unreacted from said reaction device when the temperature of said reaction device is below said minimum temperature through said separating and storing means whereby unreacted exhaust gas constituents are separated and stored therein, and means for directing air through said separating and storing means and into said reaction device when the temperature of said reaction device is above said minimum temperature to thereby strip the unreacted exhaust gas constituents from said separating and storing means and recycle such constituents to said reaction device, whereby exhaust gas constituents flowing unreacted through said reaction device when the temperature of said reaction device is below said minimum temperature are recycled through and reacted in said reaction device when the temperature of said reaction device is above said minimum temperature.

10. The combination set forth in claim 9 which further comprises means for applying heat to said separating and storing means when the temperature of said reaction device is above said minimum temperature to thereby promote stripping of unreacted exhaust gas constituents from said separating and storing means.

11. The combination set forth in claim 10 wherein said heat applying means heats the air directed through said separating and storing means.

12. In an internal-combustion engine power plant having a combustion chamber, an outlet passage opening to the atmosphere, an exhaust gas reaction device disposed between said combustion chamber and said outlet passage and effective to cause reaction of exhaust gas constituents flowing therethrough from said combustion chamber to said outlet passage when the temperature of said reaction device is above a minimum temperature to thereby prevent emission of such constituents to the atmosphere, the combination comprising:

storage means for retaining unreacted exhaust gas constituents, a diversion passage connecting said storage means and said reaction device, means for sensing the temperature of said reaction device, valve means disposed in said outlet and diversion passages and operated by said temperature sensing means for closing said outlet passage and opening said diversion passage when the temperature of said reaction device is below said minimum temperature to direct unreacted exhaust gas constituents into said storage means and prevent emission of such constituents to the atmosphere, said valve means being further operated by said temperature sensing means for opening said outlet passage and closing said diversion passage when the temperature of said reaction device is above said minimum temperature, and means for recycling retained exhaust gas constituents from said storage means to said reaction device when the temperature of said reaction device is above said minimum temperature, whereby exhaust gas constituents flowing unreacted through said reaction device when the temperature of said reaction device is below said minimum temperature are recycled through and reacted in said reaction device when the temperature of said reaction device is above said minimum temperature.

13. In an internal-combustion engine having a combustion chamber, the combination comprising:

an exhaust gas reaction device having an inlet passage connected to said combustion chamber for receiving gases exhausted therefrom and having first and second discharge passages, said reaction device being effective to cause reaction of exhaust gas constituents when the temperature of said reaction device is above a minimum temperature, storage means for retaining unreacted exhaust gas constituents, said first discharge passage opening directly to atmosphere, said second discharge passage extending to said storage means, valve means in said discharge passages for closing said first discharge passage while opening said second discharge passage and for opening said first discharge passage while closing said second discharge passage, means responsive to the temperature of said reaction device for causing said valve means to close said first discharge passage and open said second discharge passage when the temperature of said reaction device is below said minimum temperature whereby flow of unreacted exhaust gas constituents to the atmosphere is prevented and unreacted exhaust gas constituents are retained in said storage means, said temperature responsive means also being responsive to the temperature of said reaction device for causing said valve means to open said first discharge passage and close said second discharge passage when the temperature of said reaction device is above said minimum temperature, a return passage connecting said storage means to said inlet passage for recycling the retained exhaust gas constituents from said storage means to said reaction device, and additional valve means in said return passage, said temperature responsive means further being responsive to the temperature of said reaction device for causing said additional valve means to close said return passage when the temperature of said reaction device is below said minimum temperature and to open said return passage when the temperature of said reaction device is above said minimum temperature, whereby exhaust gas constituents flowing unreacted through said reaction device when the temperature of said reaction device is below said minimum temperature are recycled through and reacted in said reaction device when the temperature of said reaction device is above said minimum temperature.

14. The combination set forth in claim 13 wherein said storage means includes a first container which expands as exhaust gases are directed thereto and contracts as exhaust gases are recycled therefrom, a second container of material which separates certain unreacted exhaust gas constituents from the flow of exhaust gases directed thereto, and an overflow passage extending from said first container to said second container, and wherein said second discharge passage extends to said first container, whereby at least a portion of the entire exhaust gas flow is retained in said first container and whereby certain unreacted exhaust gas constituents are separated from any remaining portion of the exhaust gas flow through said second discharge passage and are retained in said second container.

* * * * *